United States Patent
Hurlocker et al.

(10) Patent No.: US 10,839,060 B1
(45) Date of Patent: Nov. 17, 2020

(54) TECHNIQUES FOR MULTI-VOICE SPEECH RECOGNITION COMMANDS

(71) Applicant: Capital One Services, LLC, McLean, VA (US)

(72) Inventors: Paul Hurlocker, Richmond, VA (US); Austin Grant Walters, Savoy, IL (US); Jeremy Edward Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/552,265

(22) Filed: Aug. 27, 2019

(51) Int. Cl.
*H04L 29/06* (2006.01)
*G06F 21/32* (2013.01)
*G10L 17/06* (2013.01)
*G10L 17/24* (2013.01)

(52) U.S. Cl.
CPC .............. *G06F 21/32* (2013.01); *G10L 17/06* (2013.01); *G10L 17/24* (2013.01); *H04L 63/0861* (2013.01)

(58) Field of Classification Search
CPC ......... G06F 21/32; G10L 17/06; G10L 17/24; H04L 63/0861
See application file for complete search history.

(56) References Cited

U.S. PATENT DOCUMENTS

| | | | | |
|---|---|---|---|---|
| 7,890,136 B1* | 2/2011 | Fujisaki | .............. | H04M 1/6016 455/556.1 |
| 8,985,442 B1* | 3/2015 | Zhou | ........................ | G06F 3/016 235/380 |
| 9,324,322 B1* | 4/2016 | Torok | ..................... | G10L 15/22 |
| 9,646,628 B1* | 5/2017 | Carlson | .............. | G10L 21/0208 |
| 9,892,732 B1* | 2/2018 | Tian | .......................... | G01S 3/80 |
| 10,027,662 B1* | 7/2018 | Mutagi | .................... | G10L 17/22 |
| 10,069,976 B1* | 9/2018 | Gunther | .............. | H04M 3/5237 |
| 10,074,374 B2* | 9/2018 | Brands | ................... | H04L 9/3234 |
| 10,304,475 B1* | 5/2019 | Wang | .................. | G10L 21/0216 |
| 10,305,894 B2* | 5/2019 | Brown | .................. | H04L 9/3239 |
| 10,623,403 B1* | 4/2020 | Gupta | ..................... | G06F 21/31 |
| 10,665,244 B1* | 5/2020 | Gupta | ..................... | G10L 17/06 |
| 2003/0210770 A1* | 11/2003 | Krejcarek | ......... | H04M 3/42382 379/88.17 |
| 2005/0185779 A1* | 8/2005 | Toms | .................. | H04M 3/2281 379/114.14 |
| 2010/0158219 A1* | 6/2010 | Dhawan | .............. | H04M 3/4936 379/88.18 |
| 2013/0196629 A1* | 8/2013 | Masuoka | ............ | H04L 63/0861 455/411 |

(Continued)

OTHER PUBLICATIONS

Author unknown, ONENIGMA Software, Strategy, & Design website [online] 2019 [retrieved on Aug. 23, 2019]. Retrieved from Internet URL: https://www.onenigma.com/, 4 pages.

*Primary Examiner* — David Garcia Cervetti

(57) ABSTRACT

Various embodiments are generally directed to techniques for multi-voice speech recognition commands, such as based on monitoring a telecommunications channel between first and second devices, for instance. Some embodiments are particularly directed to prompting initiation of a transaction between a first entity associated with a first device and a second entity associated with a second device based on detection of an audible request corresponding to the second entity and an audible response corresponding to the first entity.

20 Claims, 10 Drawing Sheets

(56) References Cited

U.S. PATENT DOCUMENTS

| | | | |
|---|---|---|---|
| 2013/0225128 A1* | 8/2013 | Gomar | G10L 17/005 455/411 |
| 2014/0310269 A1* | 10/2014 | Zhang | G06F 16/68 707/725 |
| 2014/0351133 A1* | 11/2014 | Christian | G06Q 20/40 705/44 |
| 2015/0112691 A1 | 4/2015 | LeBeau et al. | |
| 2015/0142438 A1* | 5/2015 | Dai | G10L 17/02 704/246 |
| 2015/0156173 A1* | 6/2015 | Wong | H04L 63/0428 713/170 |
| 2015/0242837 A1* | 8/2015 | Yarbrough | G06Q 20/327 705/44 |
| 2015/0287416 A1* | 10/2015 | Brands | H04L 63/18 704/273 |
| 2016/0182504 A1* | 6/2016 | Li | H04L 63/0876 726/5 |
| 2017/0025124 A1* | 1/2017 | Mixter | G10L 15/22 |
| 2017/0034160 A1* | 2/2017 | Brands | H04L 9/3234 |
| 2017/0053110 A1* | 2/2017 | Wang | H04L 63/10 |
| 2017/0092276 A1* | 3/2017 | Sun | G10L 17/08 |
| 2017/0330183 A1* | 11/2017 | Modi | G06Q 20/3223 |
| 2017/0344992 A1* | 11/2017 | Li | G06Q 20/322 |
| 2017/0364898 A1* | 12/2017 | Ach, II | G06Q 50/01 |
| 2017/0371620 A1* | 12/2017 | Zhou | H04L 51/046 |
| 2018/0007210 A1* | 1/2018 | Todasco | H04M 3/53333 |
| 2018/0039975 A1* | 2/2018 | Hefetz | G06Q 20/3224 |
| 2018/0046495 A1* | 2/2018 | VanBlon | G06F 9/4812 |
| 2018/0047394 A1* | 2/2018 | Tian | G01S 5/00 |
| 2018/0048767 A1* | 2/2018 | Tinsman | H04M 1/72519 |
| 2018/0061402 A1* | 3/2018 | Devaraj | G10L 15/1822 |
| 2018/0061403 A1* | 3/2018 | Devaraj | G06F 3/167 |
| 2018/0061404 A1* | 3/2018 | Devaraj | G06F 3/167 |
| 2018/0061422 A1* | 3/2018 | Wang | G10L 17/22 |
| 2018/0096690 A1* | 4/2018 | Mixter | G06F 3/167 |
| 2018/0137865 A1* | 5/2018 | Ling | H04L 29/06 |
| 2018/0144346 A1* | 5/2018 | Yu | G06F 21/32 |
| 2018/0225671 A1* | 8/2018 | Brown | H04L 63/0869 |
| 2018/0232740 A1* | 8/2018 | Brown | G06Q 20/382 |
| 2018/0268476 A1* | 9/2018 | Brown | G06Q 20/12 |
| 2018/0277122 A1* | 9/2018 | Li | G06F 16/686 |
| 2018/0359233 A1* | 12/2018 | Alexander | H04L 63/08 |
| 2018/0366128 A1* | 12/2018 | Liu | G10L 17/02 |
| 2019/0182176 A1* | 6/2019 | Niewczas | H04L 47/803 |
| 2019/0205889 A1* | 7/2019 | Cantrell | H04L 9/3236 |
| 2019/0228770 A1* | 7/2019 | Li | H04M 1/72519 |
| 2019/0251960 A1* | 8/2019 | Maker | G10L 15/08 |
| 2019/0251975 A1* | 8/2019 | Choi | H04L 63/083 |
| 2019/0272831 A1* | 9/2019 | Kajarekar | G10L 15/22 |
| 2019/0295203 A1* | 9/2019 | Cho | G06Q 50/265 |
| 2019/0306164 A1* | 10/2019 | Brands | H04L 9/3228 |
| 2019/0318159 A1* | 10/2019 | Blanc-Paques | G06K 9/00288 |
| 2019/0325865 A1* | 10/2019 | Oktem | G10L 15/30 |
| 2019/0348048 A1* | 11/2019 | Werner | G06Q 10/109 |
| 2020/0097955 A1* | 3/2020 | Gandhi | G06N 20/00 |

* cited by examiner

100

200A

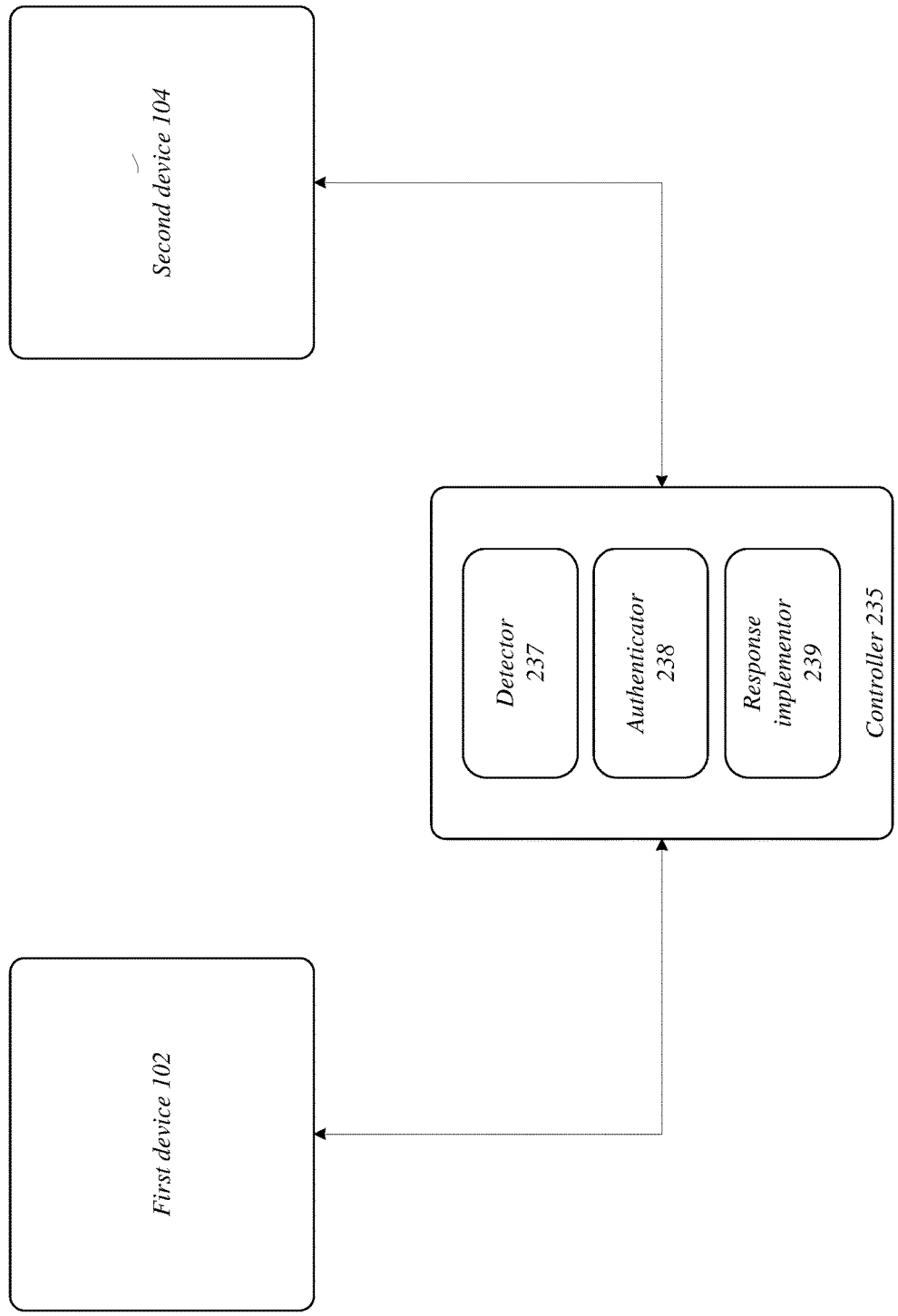

400

500A

500B

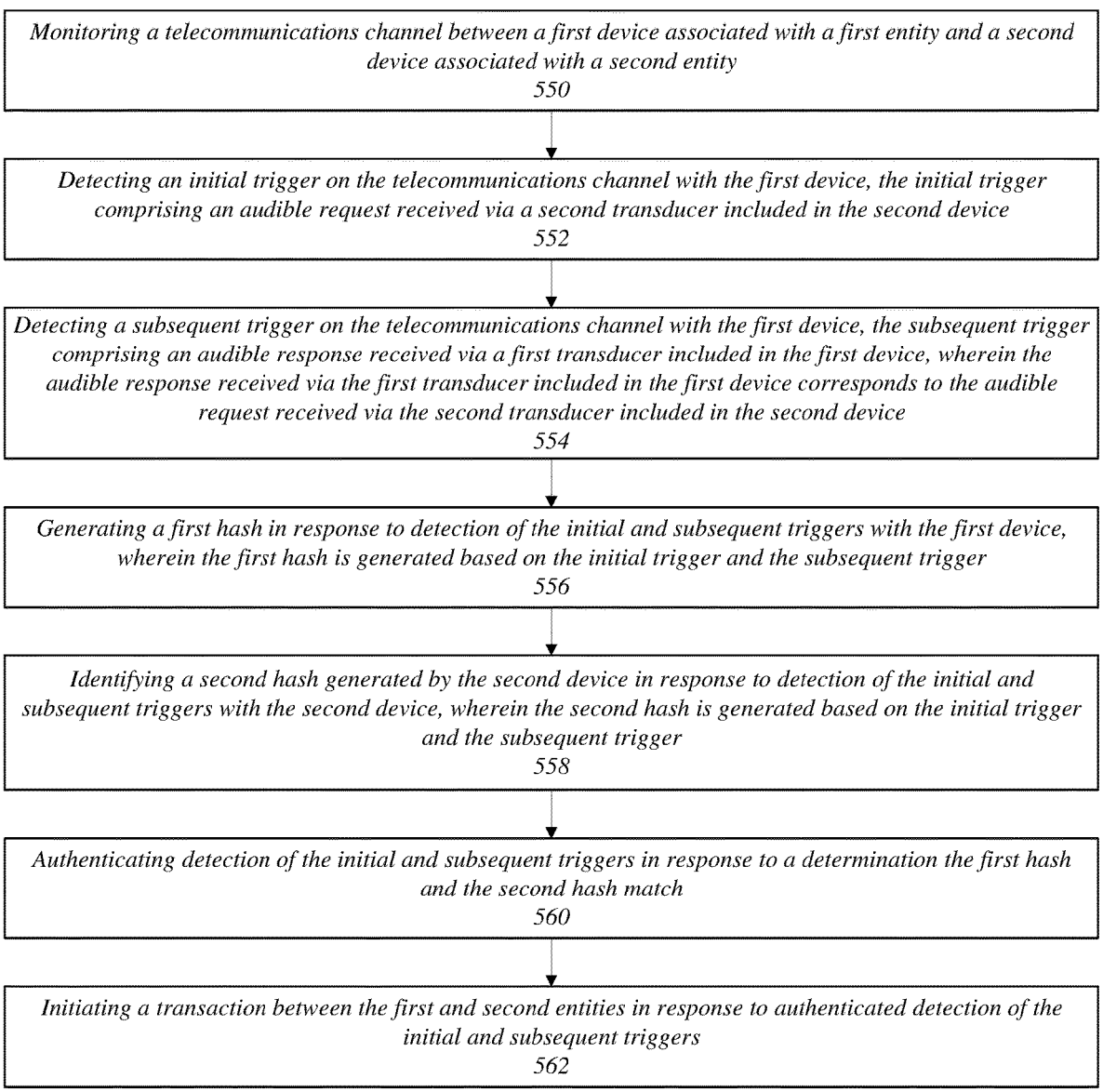

600

TECHNIQUES FOR MULTI-VOICE SPEECH RECOGNITION COMMANDS

BACKGROUND

Generally, speech recognition can refer to the interdisciplinary subfield of computational linguistics that develops methodologies and technologies that enable the recognition and translation of spoken language into text by computers. Speech recognition may also be known as automatic speech recognition (ASR), computer speech recognition, or speech to text (STT). Typically, it incorporates knowledge and research in the linguistics, computer science, and electrical engineering fields. Some speech recognition systems require training where an individual speaker reads text or isolated vocabulary into the system. The system analyzes the specific voice of the speaker and uses it to fine-tune the recognition of their speech, resulting in increased accuracy. Typically, the term voice recognition, or speaker identification, refers to identifying the speaker, rather than what they are saying. Recognizing the speaker can simplify the task of translating speech in systems that have been trained on a specific voice or it can be used to authenticate or verify the identity of a speaker as part of a security process.

BRIEF DESCRIPTION OF THE DRAWINGS

FIGS. 2A and 2B illustrate second and third exemplary operating environments for multi-voice speech recognition commands according to one or more embodiments described herein.

FIG. 5C illustrates a third exemplary logic flow according to one or more embodiments described herein.

DETAILED DESCRIPTION

Figure 1:
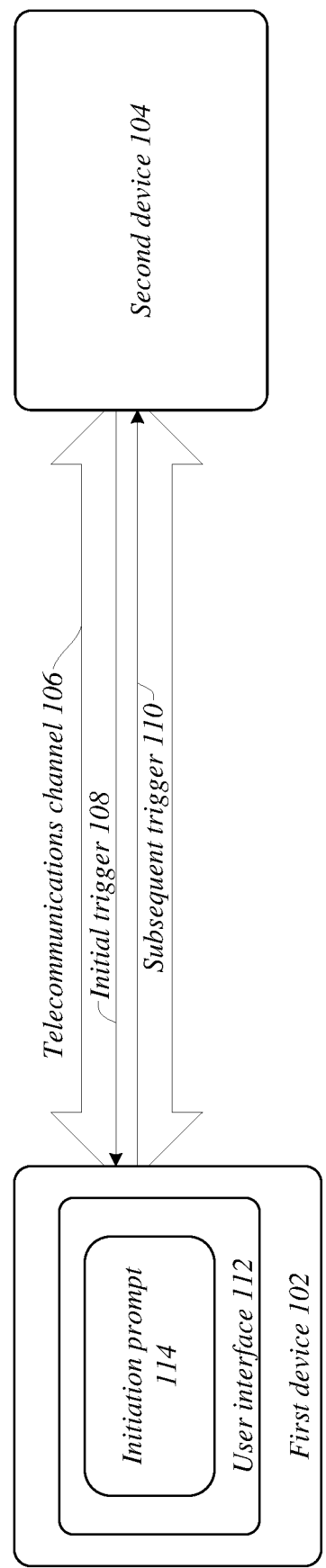
FIG. 1 illustrates a first exemplary operating environment for multi-voice speech recognition commands according to one or more embodiments described herein.

Various embodiments are generally directed to techniques for multi-voice speech recognition commands, such as based on monitoring a telecommunications channel between first and second devices, for instance. Some embodiments are particularly directed to prompting initiation of a transaction between a first entity associated with a first device and a second entity associated with a second device based on detection of an audible request corresponding to the second entity and an audible response corresponding to the first entity. In one embodiment, for example, an apparatus may comprise a processor and memory comprising instructions that when executed by the processor cause the processor to perform one or more of the following. In many embodiments, the processor may monitor a telecommunications channel between a first device associated with a first entity and a second device associated with a second entity. In some embodiments, the processor may detect an initial trigger on the telecommunications with the first device. In some such embodiments, the initial trigger may comprise an audible request received via a second transducer included in the second device.

In several embodiments, the processor may detect a subsequent trigger on the telecommunications channel with the first device. In several such embodiments, the subsequent trigger may include an audible response received via a first transducer included in the first device. In various embodiments, the audible response received via the first transducer included in the first device may correspond to the audible request received via the second transducer included in the second device. In many embodiments, the processor may generate a first hash in response to detection of the initial and subsequent triggers with the first device. In many such embodiments, the first hash may be generated based on the initial trigger and the subsequent trigger. In one or more embodiments, the processor may identify a second hash generated by the second device in response to detection of the initial and subsequent triggers with the second device. In one or more such embodiments, the second hash may be generated based on the initial trigger and subsequent trigger. In some embodiments, the processor may determine the first hash and the second hash match based on a comparison. In many embodiments, the processor may authenticate detection of the initial and subsequent triggers based on the comparison. In various embodiments, the processor may generate a prompt on the first device to initiate a transaction between the first and second entities in response to authenticated detection of the initial and subsequent triggers. These and other embodiments are described and claimed.

Some challenges facing speech recognition systems include utilizing multiple voices in commands, such as based on a conversational exchange. For example, systems may only detect commands that are simple phrases, regardless of context. Additionally, a user may have to train a system to identify the simple phrase and/or explicitly program the system with what to do in response to the simple phrase. For instance, the target of a command may need to be explicitly identified, instead of being determined from context. Adding further complexity, systems may not be capable of distinguishing multiple parties and/or determining identity of each party. For example, systems may perform actions in response to a command regardless of the voice issuing the command. However, this can lead to unauthorized use and/or unintended consequences. These and other factors may result in unsecure systems with limited applicability, resulting in poor user experiences and reduced functionality. Such limitations can drastically reduce the appeal of products, systems, and/or services offered via speech recognition systems, contributing to lost revenues, limited adaptability, and reduced usability.

Various embodiments described herein include devices capable of detecting and authenticating complex or compound speech recognition commands, such as multi-voice speech recognition commands, to effectively and securely initiate or prompt responses to multi-voice speech recognition commands. In many embodiments, one or more device described herein may detect a multi-voice command on a telecommunications channel between multiple devices. For example, a first device associated with a first entity may detect an initial trigger based on audio communications received from a second device associated with a second entity and then detect a subsequent trigger based on audio communications received at the first device via a transducer. In some such examples, the second device may similarly detect the initial trigger based on audio communications received at the second device via a transducer and then detect the subsequent trigger based on audio communications received from the first device. In some embodiments, the initial trigger may be a request and the subsequent trigger may be a response to the request.

In various embodiments, one or more devices described herein may authenticate a compound command. For instance, hashes may be generated by the first and second devices based on independent detection of initial and subsequent triggers. In such instances, the hashes may be compared to authenticate detection of the compound command. In some embodiments, one or more device described herein may determine at least a portion of what to do in response to the complex or compound command based on conversational context of the command. For example, context of a conversation may indicate a first device corresponds to a first entity and a second device corresponds to a second entity. Accordingly, the target of the command (e.g., the first entity or the second entity) may be identified based on the context of the conversation. In various embodiments, one or more device described herein may identify entities based on associated speech included in audio signals, such as using a voice fingerprint. One or more of these components and/or techniques may be used as part of a novel process to automatically detect, authenticate, initiate, and/or implement one or more compound commands based on a conversation between multiple entities.

One or more techniques described herein may enable increased adaptability, usability, and appeal of products, systems, and/or services offered via speech recognition systems, promoting improved products, systems, and/or services and leading to better functionality and increased convenience. In these and other ways, components/techniques described here may identify methods to increase efficiency, decrease user input, improve usability public perception, and/or expand desirability via realization of multi-voice speech recognition commands in an accurate, reactive, efficient, dynamic, and scalable manner, resulting in several technical effects and advantages over conventional computer technology, including increased capabilities and improved adaptability. In various embodiments, one or more of the aspects, techniques, and/or components described herein may be implemented in a practical application via one or more computing devices, and thereby provide additional and useful functionality to the one or more computing devices, resulting in more capable, better functioning, and improved computing devices. Further, one or more of the aspects, techniques, and/or components described herein may be utilized to improve one or more technical fields including speech recognition, voice recognition, telecommunications, automated personal assistants, user interactions, and provision of products, systems, and/or services.

In several embodiments, components described herein may provide specific and particular manners of to enable multi-voice speech recognition commands. In several such embodiments, the specific and particular manners may include, for instance, one or more of detecting a complex command with an initial trigger and a subsequent trigger, detecting complex commands in a conversation, authenticating a multi-voice speech recognition command based on detection of the multi-voice speech recognition command by multiple devices, and/or determining one or more portions/actions of how to respond to the complex command based on a conversation and/or context of the conversation. In many embodiments, one or more of the components described herein may be implemented as a set of rules that improve computer-related technology by allowing a function not previously performable by a computer that enables an improved technological result to be achieved. For example, the function allowed may include one or more aspects of speech recognition, voice recognition, telecommunications, automated personal assistants, user interactions, and provision of products, systems, and/or services described herein.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary operating environment 100 for multi-voice speech recognition commands according to one or more embodiments described herein. Operating environment 100 may include a first device 102, a second device 104, and a telecommunications channel 106 between the first device 102 and the second device 104. In one or more embodiments described herein, the first device may provide a user interface 112 with an initiation prompt 114 in response to authenticated detection of an initial trigger 108 and a subsequent trigger 110 on the telecommunications channel 106. In some embodiments, authentication detection of the initial trigger 108 and the subsequent trigger 110 may include verification that the initial and subsequent triggers were detected by both the first device 102 and the second device 104. Embodiments are not limited in this context.

In many embodiments, telecommunications channel 106 may include a telephone connection between the first device 102 and the second device 104. In several embodiments, the first device 102 and/or the second device 104 may monitor the telecommunications channel 106 for multi-voice speech recognition commands (e.g., initial trigger 108 and subsequent trigger 110). For instance, the initial trigger 108 may include a request for money communicated by an entity using the second device 104 to an entity using the first device 102 via telecommunications channel 106. Further, the subsequent trigger 110 may include a response agreeing to the request for money communicated by the entity using the first device 102 to the entity using the second device 104. In such instances, in response to detection of the initial trigger 108 and the subsequent trigger 110, the first device 102 may communicate the initiation prompt 114 to the entity using the first device 102 via user interface 112. The initiation prompt 114 may a pop up offering to transfer funds from the entity using the first device 102 to the entity using the second device 104.

In various embodiments, the first and second devices 102, 104 may include a computer such as a mobile phone, a laptop, a desktop, a tablet, or the like. In various such embodiments, the first and second device 102, 104 may be different types of computers. As will be appreciated, various techniques and/or components described herein may be applied to or expanded upon without departing from the scope of this disclosure. For example, in several embodiments, more than two devices may be utilized in triggering commands. In further such examples, a bill may be split among a group of restaurant patrons based on one or more triggers associated each member of the group. In various embodiments, one or more triggers may be detected by each device in the group. For instance, everyone in a group may agree to give a driver five dollars and corresponding devices may detect the same and/or different triggers to initiate the transactions.

In many embodiments, one or more of the triggers may be detected absent a telecommunications channel established between devices. For example, triggers 108, 110 (e.g., audible request and response) may be detected as part of an in-person conversation in which the first and second devices 102, 104 are in physical proximity. In some such examples, location/proximity of devices may be used as part of triggers and/or authentication processes. In some embodiments, triggers may require detection/be detected by two or more devices, such as in a public setting or conference call.

In some embodiments, prompts (e.g., initiation prompt 114) may be generated on one or more devices (e.g., first device 102 and second device 104). For instance, the second device 104 could prompt confirmation of a transaction amount. In another instance, each device in a group could utilize prompts to submit, negotiate, and/or confirm details of the transaction, such as share, amount, tip, responsible items (e.g., select dinner/drinks consumed), and the like. In one or more embodiments, prompts may appear on one or more devices based on a risk level associated with each respective device and the corresponding portion of a transaction. For instance, sending money is riskier than receiving money.

In some embodiments, detection of the initial trigger 108 and the subsequent trigger 110 may include utilizing speech recognition to identify one or more words/phrases corresponding to the initial trigger 108 and one or more words/phrases corresponding to the subsequent trigger 110. In one or more embodiments, one or more textual transcripts of a conversation over telecommunications channel 106 may be generated by the first device 102 and/or the second device 104 as part of detecting the initial and subsequent triggers 110. In various embodiments, detection of the initial trigger 108 and the subsequent trigger 110 may include utilizing voice recognition to associate a first entity with the first device 102 and/or a second entity with the second device 104.

In some embodiments, voice fingerprints may be used to associate the first entity with the first device 102 and/or the second entity with the second device 104. In many embodiments, at least a portion of what to do in response to the complex or compound command based on conversational context of the command. For example, context of a conversation may indicate a first device corresponds to a first entity and a second device corresponds to a second entity. Accordingly, the target of the command (e.g., the first entity or the second entity) may be identified based on the context of the conversation. In various embodiments, detection of the initial trigger 108 and the subsequent trigger 110 may be unilateral (e.g., performed by a single device) or bilateral (e.g., performed by the first device 102 and the second device 104). In embodiments of unilateral detection, a single device (e.g., first device 102) may be used to detect the initial and subsequent triggers 108, 110. In embodiments of bilateral detection, two devices (e.g., first and second device 102, 104) may independently detect the initial and subsequent triggers 108, 110.

In several embodiments, one or more of the triggers may be customized and/or controlled by one or more of the entities. For example, embodiments may include any number and/or order of triggers. However, for clarity, the illustrated embodiments may only include an initial trigger and a subsequent trigger. More generally, the collection of triggers for a command associated with a response may be referred to as a trigger set. In many embodiments, one or more of the triggers may include wildcards and/or blanks. For example, initial trigger 108 may include "name-wildcard will you pay me amount-blank". In various embodiments, variations or permutations in order and/or wording of a trigger may be allowed. For instance, "will you compensate me" may be accepted in place of "will you pay me". In another example, the initial and subsequent triggers may be reversed. Accordingly, the initial trigger 108 may include an offer by a first entity associated with the first device 102 to purchase an item from a second entity associated with the second device 104 and the subsequent trigger 110 may include offer acceptance by the second entity associated with the second device 104.

In some embodiments, detection of the initial and subsequent triggers 108, 110 may be required to occur within a threshold amount of time. In one or more embodiments, detection of the initial and subsequent triggers 108, 110 may be required to occur in adjacent portions of a conversation. For example, acceptance to pay a requested amount may be required to be in the next blurb of spoken by the responding entity.

In many embodiments, authentication of the detection of the initial trigger 108 and the subsequent trigger 110 may be required prior to communicating the initiation prompt 114 via user interface 112. In several embodiments, authentication of the initial and subsequent triggers 108, 110 may include using voice recognition to confirm the identity of the first entity associated with the first device 102 and/or the identity of the second entity associated with the second device 104. In various embodiments, authentication of the initial and subsequent triggers 108, 110 may include using speech recognition to confirm appropriate initial and subsequent triggers 108, 110.

In various embodiments, authentication of the initial trigger 108 and the subsequent trigger 110 may be unilateral (e.g., performed by a single device) or bilateral (e.g., performed by the first device 102 and the second device 104). In embodiments of unilateral authentication, a single device (e.g., first device 102) may be used to authenticate detection of the initial and subsequent triggers 108, 110. For example, first device 102 may generate one or more hashes based on the initial and subsequent triggers 108, 110 and compare the one or more hashes to one or more verified hashes to authenticate detection. In embodiments of bilateral authentication, two devices (e.g., first and second device 102, 104) may be used to authenticate detection of the initial and subsequent triggers 108, 110. For instance, one or more hashes generated by each of the first and second device 102, 104 based on the initial and subsequent triggers 108, 110 may be compared to each other and/or one or more verified hashes to authenticate detections.

In several embodiments, one or more details of the one or more responses and/or actions performed in response to authenticated detection of the initial and subsequent triggers 108, 110 may be determined based on the conversation and/or context. In various such embodiments, one or more details of the agreement determined based on the conversation and/or context may be included in the initiation prompt 114. For example, the amount to transfer from the first entity to the second entity may be determined from the conversation. In some embodiments, one or more details of the agreement and/or action performed in response to authenticated detection of the initial and subsequent triggers 108, 110 may be proposed in the initiation prompt 114 based on the conversation and/or context. For instance, the initiation prompt 114 may include a request that the amount to be transferred be confirmed or the identity of one or more of the entities be confirmed. In another example, a memo for the transaction may be proposed in the initiation prompt 114. In one or more embodiments, the initiation prompt 114 may require additional authentication before funds are transferred. For example, a user may have to provide a pin or submit to a biometric reading (e.g., finger print scan and/or facial recognition).

Figure 2A:
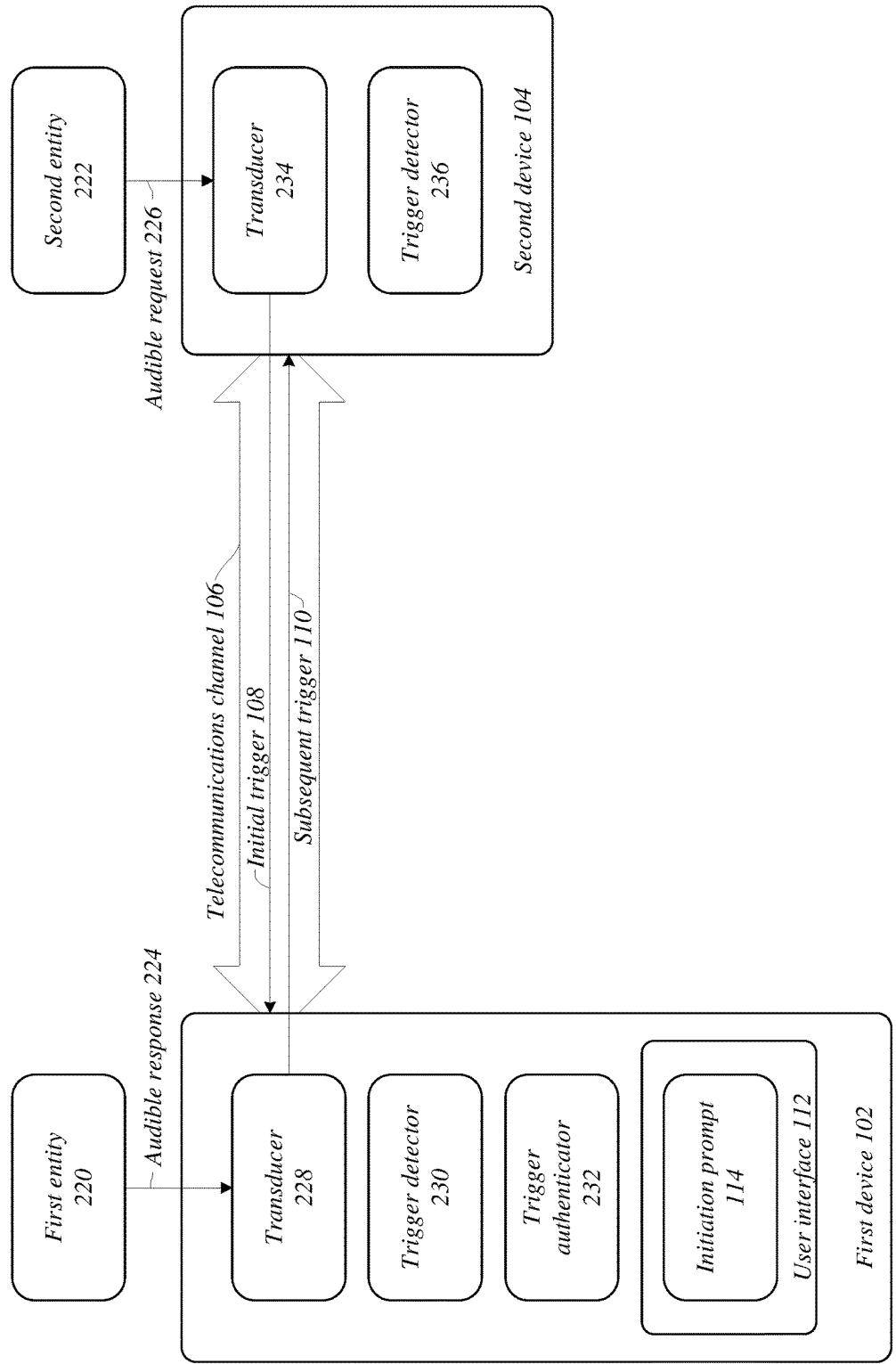

FIGS. 2A and 2B illustrate exemplary operating environments 200A, 200B for multi-voice speech recognition commands according to one or more embodiments described herein. In some embodiments, operating environments 200A, 200B and/or one or more components thereof may be the same or similar to operating environment 100 and/or one or more components thereof. In addition to the components of operating environment 100, operating environment 200A may include a first entity 220 associated with the first device 102, a second entity 222 associated with the second device 104. Also, first device 102 may include transducer 228, trigger detector 230, and trigger authenticator 232 and second device 104 may include transducer 234 and trigger detector 236. In one or more embodiments described herein, the initial trigger 108 may comprise one or more portions of an audible request 226 made by the second entity 222 into transducer 234 of the second device 104 and the subsequent trigger 110 may comprise one or more portions of an audible response 224 made by the first entity 220 into transducer 228 of the first device. Operating environment 200B may include first device 102, second device 104, and controller 235 with authenticator 238 and implementor 239. Embodiments are not limited in this context.

Referring to FIG. 2A, in many embodiments, the one or more portions of the audible request 226 comprising the initial trigger 108 may be detected by one or more of trigger detector 230 of the first device 102 and trigger detector 236 of the second device 104 (e.g., unilateral detection or bilateral detection). In some embodiments, trigger detector 230 of the first device 102 and trigger detector 236 of the second device 104 may independently monitor the telecommunications channel 106 between the first device 102 associated with the first entity 220 and the second device. In many embodiments, trigger detector 230 of the first device 102 and trigger detector 236 of the second device 104 may independently detect the initial trigger 108 on the telecommunications channel 106. In many such embodiments, initial trigger 108 may comprise the audible request 226 (or one or more portions thereof) received via the transducer 234 included in the second device 104.

In several embodiments, trigger detector 230 of the first device 102 and trigger detector 236 of the second device 104 may independently detect the subsequent trigger 110 on the telecommunications channel 106. In several such embodiments, the subsequent trigger 110 may comprise the audible response 224 (or one or more portions thereof) received via the transducer 228 included in the first device 104. In various embodiments, the audible response received via the first transducer included in the first device corresponds to the audible request received via the second transducer included in the second device. For instance, the audible request 226 may be to make a reservation and the audible response 224 may be acceptance of the reservation.

In some embodiments, the first device 102 (e.g., via trigger detector 230) may generate a first hash based on the initial and subsequent triggers 108, 110 in response to detection of the initial and subsequent triggers 108, 110. In various embodiments, the second device 104 (e.g., via trigger detector 236) may generate a second hash based on the initial and subsequent triggers 108, 110 in response to detection of the initial and subsequent triggers 108, 110. In many embodiments, the second device 104 may communicate the second hash to the first device 102, such as via a separate data channel or the telecommunications channel 106.

In one or more embodiments, the first device 102 (e.g., trigger authenticator 232) may identify the second hash generated by the second device 104 in response to detection of the initial and subsequent triggers 108, 110 with the second device 104. In some embodiments, the trigger authenticator 232 may determine the first hash and the second hash match based on a comparison. In several embodiments, the trigger authenticator 232 may authenticate detection of the initial and subsequent triggers 108, 110 in response to determination that the first hash and the second hash match. In many embodiments, the first device 102 may generate the initiation prompt 114 on the user interface 112 to initiate a transaction between the first and second entities 220, 222 in response to authenticated detection of the initial and subsequent triggers 108, 110.

In various embodiments, the first device 102 may determine the first and second device are within a proximity threshold. In various such embodiments, the first device 102 may generate the initiation prompt 114 on the user interface 112 to initiate the transaction between the first and second entities 220, 222 in response to authenticated detection of the initial and subsequent triggers 108, 110 and determination the first and second devices 108, 110 are within the proximity threshold. In some embodiments, the first device 102 and/or second device 104 may verify the second entity 222 as the source of the audible request 226 based on a voice fingerprint of the second entity 222. In one or more embodiments, the first device 102 and/or second device 104 may verify the first entity 220 as the source of the audible response 224 based on a voice fingerprint of the first entity 220.

In many embodiments, the first hash and/or the second hash may be generated in response to detection of the initial and subsequent triggers 108, 110 within a predefined period of time. In several embodiments, comparison of the first hash and the second hash by trigger authenticator 232 may be included in a handshake procedure between the first and second devices 102, 104. In some embodiments, the initiation prompt 114 generated on the first device 102 to initiate a transaction between the first and second entities 220, 222 may include a request for security credentials associated with the first entity 220. In various embodiments, the audible request 226 may include a request for money, the audible response 224 may include an agreement to the request for money, and the transaction between the first and second entities 220, 222 may include a transfer of money from a first account associated with the first entity 220 and a second account associated with the second entity 222.

Referring to FIG. 2B, one or more of the detection, authentication, and response procedures and/or techniques described herein may be performed by controller 235. In various embodiments, this may occur in addition to or in place of first device 102 and/or second device 104 detection, authentication, and/or response procedures. In the illustrated embodiments, controller 235 includes detector 237, authenticator 238, and response implementor 239. In some embodiments, detector 237 may be the same or similar to trigger detector 230 and authenticator 238 may be the same or similar to trigger authenticator 232. In several embodiments, response implementer 239 may trigger prompts on one or more devices (e.g., initiation prompt 114), determine responses to input (e.g., received via user interface 112), and/or perform responses. For example, response implementor 239 may cause funds to be transferred from first entity 220 to second entity 222 based on input received via user interface 112 in response to initiation prompt 114.

In many embodiments, controller 235 may comprise a server, such as a central, authentication, or security server. In various embodiments, controller 235 may be one or more of a central authority, a certificate authority, and a trusted provider. In some embodiments, controller 235 may be communicatively coupled with first device 102 and second device 104 via a network, such as a mobile phone network and/or the internet. In some embodiments, controller 235 may be communicate with first device 102 and second device 104 on independent channels, such as via channels that utilize different protocols and/or technologies).

Figure 3:
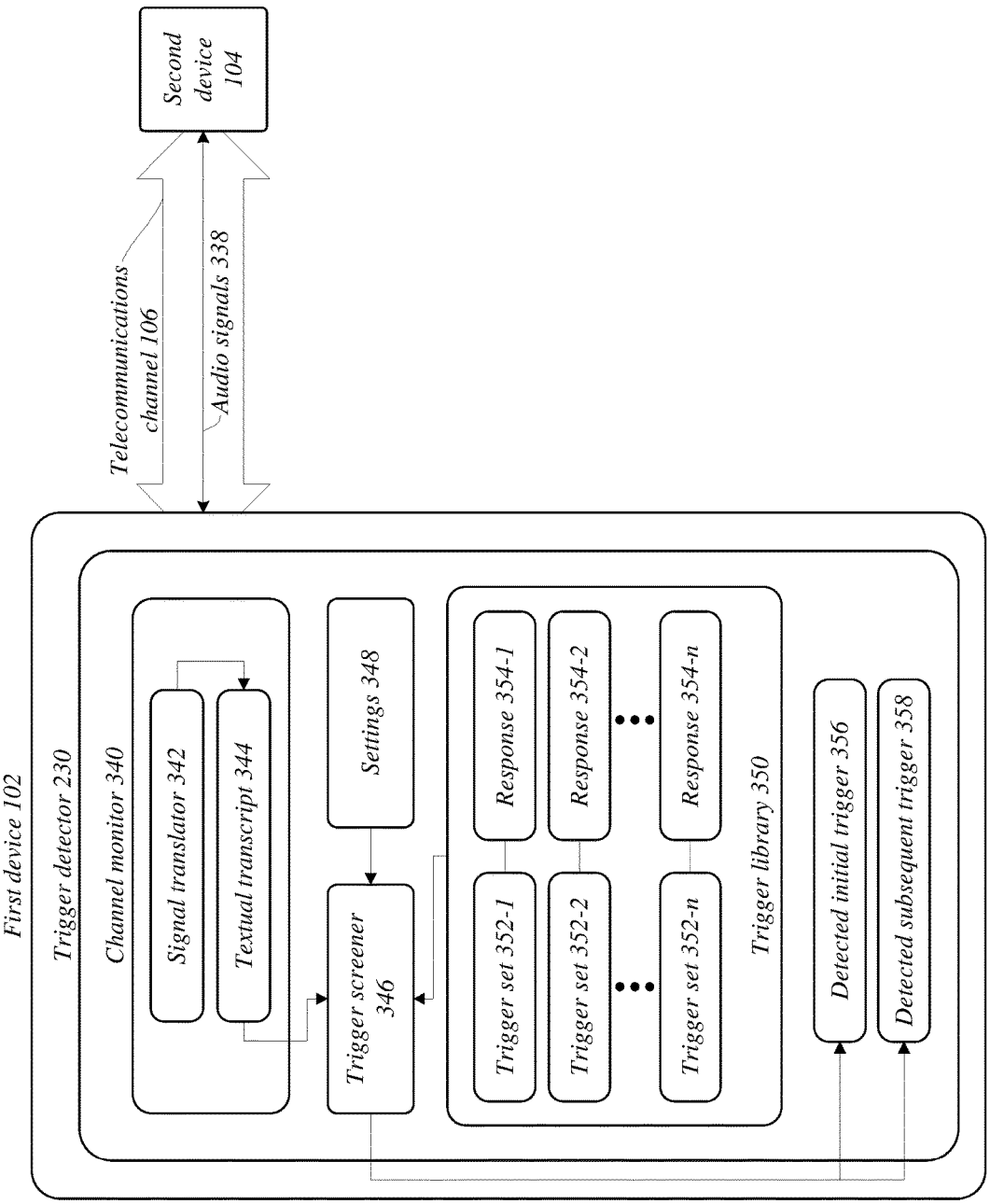
FIG. 3 illustrates an exemplary process flow for detecting triggers according to one or more embodiments described herein.

FIG. 3 illustrates an exemplary process flow 300 for detecting triggers according to one or more embodiments described herein. In some embodiments, one or more components of process flow 300 may be the same or similar to one or more other components described herein, such as in operating environments 100, 200A, 200B. The components of process flow 300 may include first device 102 with trigger detector 230, second device 104, and telecommunications channel 106 with audio signals 338. In the illustrated embodiment, trigger detector 230 may include channel monitor 340, trigger screener 346, settings 348, trigger library 350, detected initial trigger 356, and detected subsequent trigger 358. In some embodiments, second device 104 may include complimentary components to the first device 102 for detecting triggers in a similar manner to the first device 102. Embodiments are not limited in this context.

In many embodiments, audio signals 338 may comprise a conversations between a first entity utilizing the first device 102 and a second entity utilizing the second device 104. In one or more embodiments described herein, channel monitor 340 may convert audio signals 338 into a textual transcript 344 with signal translator 342. In one or more such embodiments, trigger screener 346 may identify detected initial trigger 356 and detected subsequent trigger 358 based on the textual transcript 344, settings 348, and trigger library 350. In many embodiments, the trigger library 350 may include one or more trigger sets 352-1, 352-2, 352-n (or trigger sets 352) with a corresponding number of associated responses 354-1, 354-2, 354-n (or responses 354). In some embodiments, one or more trigger sets may correspond to a common response or set of responses. In several embodiments, one or more of the responses 354-1 may include or integrate third-party actions and/or services. For example, a response may utilize a banking application or a third-party wire transfer. In some embodiments, one or more triggers may be associated with preregistered third-party voices and/or actions associated with the third party (e.g., trigger transfer to third party account).

In various embodiments, each trigger set of trigger sets 352 may include one or more triggers that command a corresponding response. For example, trigger set 352-1 may include initial trigger 108 and subsequent trigger 110 and response 354-1 may include one or more actions to perform in response to detection of the trigger set 352-1. Accordingly, when detected initial trigger 356 corresponds to initial trigger 108 and detected subsequent trigger 358 corresponds to subsequent trigger 110, the first device 102 may perform response 354-1 upon verification of the detected initial and subsequent triggers 356, 358.

In several embodiments, one or more of the trigger sets 352 may be customized and/or controlled by one or more of the entities, such as via settings 348 or by creating/manipulating trigger sets 352 and/or responses 354. For example, each of the trigger sets 352 may include any number and/or order of triggers. In some embodiments, one or more of the triggers may include wildcards and/or blanks. For example, initial trigger 108 may include "name-wildcard will you pay me amount-blank". In various embodiments, variations or permutations in order and/or wording of a trigger may be allowed. For instance, "will you compensate me" may be accepted in place of "will you pay me". In another example, the initial and subsequent triggers may be reversed. Accordingly, the initial trigger 108 may include an offer by a first entity associated with the first device 102 to purchase an item from a second entity associated with the second device 104 and the subsequent trigger 110 may include offer acceptance by the second entity associated with the second device 104.

In many embodiments, detection of the initial and subsequent triggers 108, 110 may be required to occur within a threshold amount of time. In one or more embodiments, detection of the initial and subsequent triggers 108, 110 may be required to occur in adjacent portions of a conversation. For example, acceptance to pay a requested amount may be required to be in the next blurb of spoken by the responding entity. In some embodiments, the settings 348 may include one or more of the thresholds, variations, permutations, orderings, or the like that trigger screener 346 may utilize to detect a trigger set in trigger library 350. For instance, settings 348 may include a threshold time that may elapse between detecting different triggers in a trigger set. In one or more embodiments, settings 348 may include setting for each of trigger sets 352 and/or each of responses 354.

In several embodiments, one or more details of the one or more responses 354 performed in response to authenticated detection of a trigger set may be determined based on the conversation and/or context. In various such embodiments, one or more details of the response may be determined based on the conversation and/or context. For example, the amount to transfer from the first entity to the second entity may be determined from the conversation. In some embodiments, one or more details of the one or more responses 354 performed in response to authenticated detection of a trigger set may be proposed based on the conversation and/or context. For instance, the amount to be transferred or the identity of one or more of the entities may be proposed based on the conversation and/or context. In another example, a memo for the transaction may be proposed in the initiation prompt 114.

Figure 4:
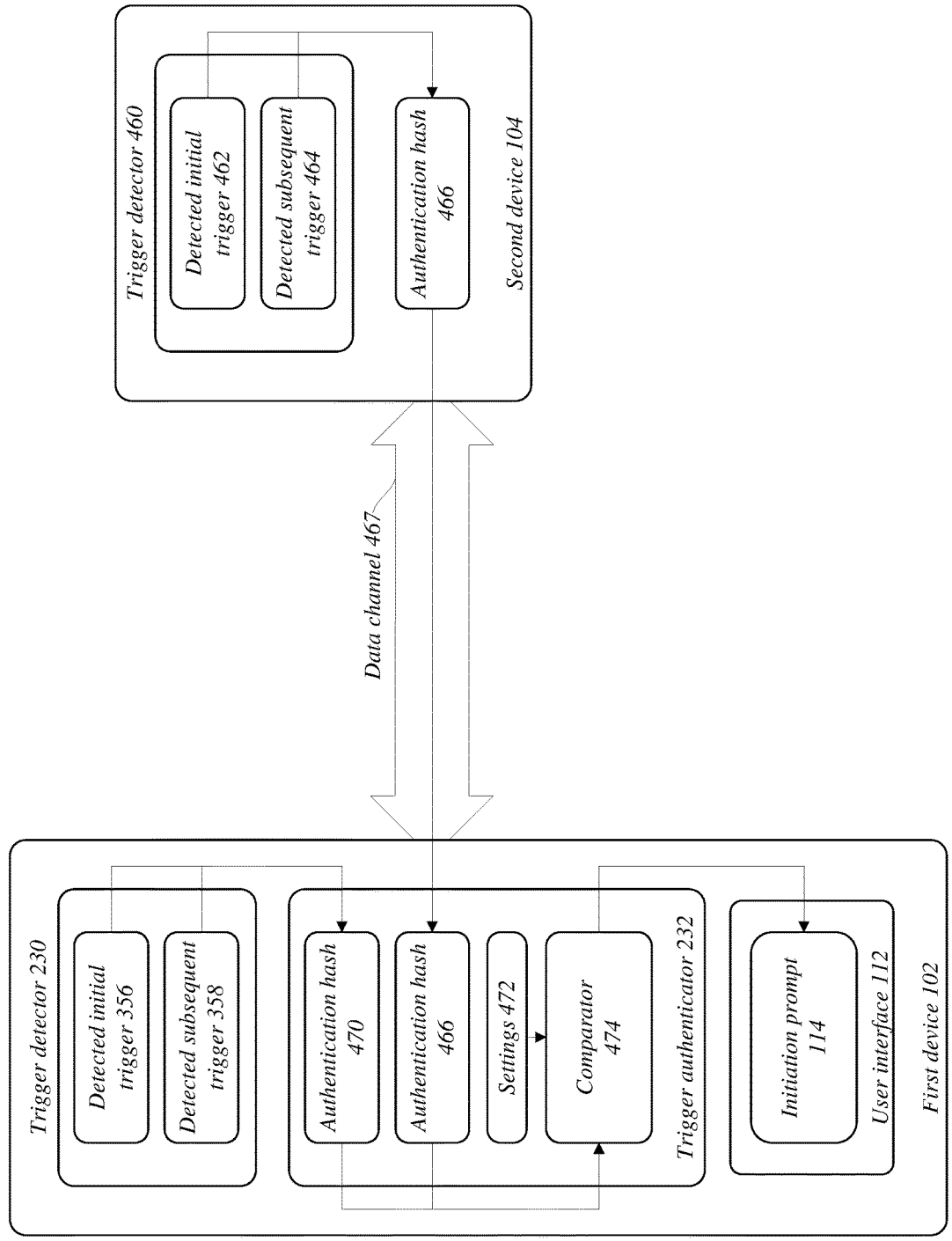
FIG. 4 illustrates an exemplary process flow for authenticating triggers according to one or more embodiments described herein.

FIG. 4 illustrates an exemplary process flow 400 for authenticating triggers according to one or more embodiments described herein. In some embodiments, one or more components of process flow 400 may be the same or similar to one or more other components described herein, such as in operating environments 100, 200A, 200B or process flow 300. The components of process flow 400 may include first device 102 with trigger detector 230, trigger authenticator 232, and user interface 112, second device 104 with trigger detector 460 and authentication hash 466, and data channel 467. In the illustrated embodiment, trigger detector 230 may include detected initial trigger 356 and detected subsequent trigger 358, trigger authenticator 232 may include authentication hash 470, authentication hash 466, settings 472, and comparator 474, user interface 112 may include initiation prompt 114, and trigger detector 460 may include detected initial trigger 462 and detected subsequent trigger 464. In some embodiments, process flow 400 may occur subsequent to process flow 300. Embodiments are not limited in this context.

In one or more embodiments described herein, authentication hash 470 may be generated by the first device 102 based on detected initial trigger 356 and detected subsequent trigger 358 and authentication hash 466 may be generated by the second device 104 based on the detected initial trigger 462 and detected subsequent trigger 464. In some embodiments, separate hashes may be generated for each detected initial trigger and each detected subsequent trigger. Accordingly, authentication hash 470 may include one or more hashes and authentication hash 466 may include one or more hashes. In several embodiments, the second device 104 may communicate authentication hash 466 via data channel 467. In various embodiments, telecommunications channel 106 may comprise data channel 467. In other embodiments, data channel 467 may be independent of telecommunications channel 106. In some embodiments, authentication hash 466 may be communicated to the first device 102 as part of a handshake operation.

In many embodiments, trigger authenticator 232 may compare authentication hash 470 and authentication hash 466. In such embodiments, when the authentication hashes 466, 470 match, the detected initial triggers 356, 462 and detected subsequent triggers 358, 464 may be authenticated. In various embodiments, comparator 474 may utilize settings 472 in determining whether the authentication hashes 466, 470 match. For example, the authentication hashes 466, 470 may include timestamps and settings 472 may indicate a threshold period of time that can elapse between the timestamps.

In one or more embodiments, authentication hash 470 may also, or alternatively, be communicated to the second device 104 and the second device 104 may similarly include a trigger authenticator to compare authentication hashes 466, 470. In one or more such embodiments, authentication hashes 466, 470 may be exchanged as part of a handshake operation.

In many embodiments, authentication of the detection of the initial trigger 108 and the subsequent trigger 110 may be required prior to communicating the initiation prompt 114 via user interface 112. In several embodiments, authentication of the detected initial and subsequent triggers 356, 462, 358, 464 may include using voice recognition to confirm the identity of a first entity associated with the first device 102 and/or the identity of a second entity associated with the second device 104. In one or more embodiments, the initiation prompt 114 may require additional authentication before funds are transferred. For example, a user may have to provide a pin or submit to a biometric reading (e.g., finger print scan and/or facial recognition).

Figure 5A:
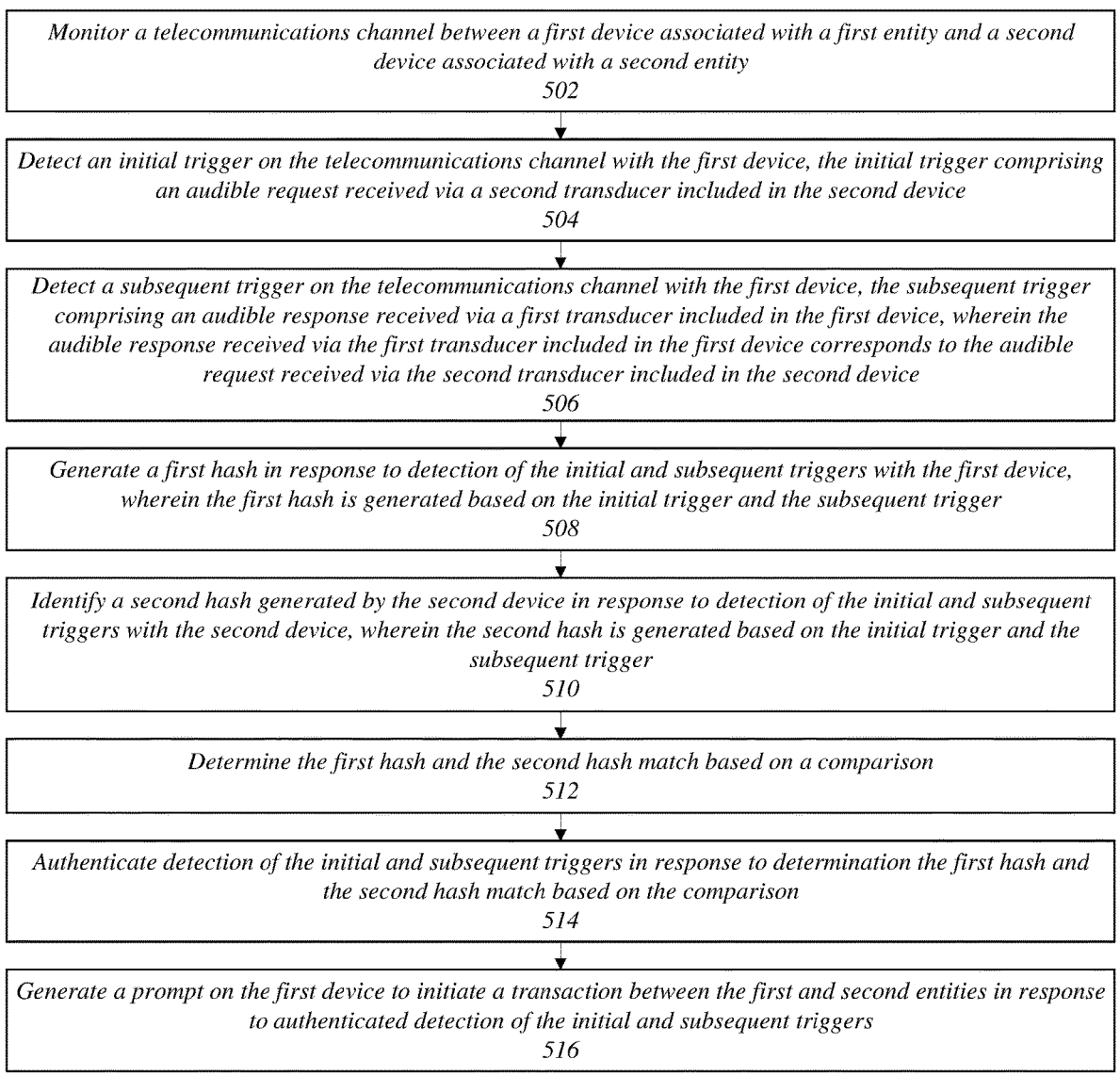
FIG. 5A illustrates a first exemplary logic flow according to one or more embodiments described herein.

FIG. 5A illustrates one embodiment of a logic flow 500A, which may be representative of operations that may be executed in various embodiments in conjunction with techniques for multi-voice speech recognition commands. The logic flow 500A may be representative of some or all of the operations that may be executed by one or more components/devices/environments described herein, such as first device 102 and/or second device 104. The embodiments are not limited in this context.

In the illustrated embodiments, logic flow 500A may begin at block 502. At block 502 "monitor a telecommunications channel between a first device associated with a first entity and a second device associated with a second entity" a telecommunications channel between a first device associated with a first entity and a second device associated with a second entity may be monitored. For example, telecommunications channel 106 between first device 102 associated with first entity 220 and second device 104 associated with second entity 222 may be monitored. At block 504 "detect an initial trigger on the telecommunications channel with the first device, the initial trigger comprising an audible request received via a second transducer included in the second device" an initial trigger comprising an audible request received via a second transducer included in the second device may be detected on the telecommunications channel with the first device. For instance, initial trigger 108 comprising audible request 226 received via transducer 234 of second device 104 may be detected on telecommunications channel 106 with trigger detector 230 of first device 102.

Continuing to block 506 "detect a subsequent trigger on the telecommunications channel with the first device, the subsequent trigger comprising an audible response received via a first transducer included in the first device, wherein the audible response received via the first transducer included in the first device corresponds to the audible request received via the second transducer included in the second device" a subsequent trigger comprising an audible response received via a first transducer included in the first device and corresponding to the audible request may be detected on the telecommunications channel with the first device. For example, subsequent trigger 110 comprising audible response 224 received via transducer 228 of first device 102 may be detected on telecommunication channel 106 with trigger detector 230 of first device 102.

At block 508 "generate a first hash in response to detection of the initial and subsequent triggers with the first device, wherein the first hash is generated based on the initial trigger and the subsequent trigger" a first hash may be generated based on the initial and subsequent triggers by the first device in response to detection of the initial and subsequent triggers with the first device. For instance, authentication hash 470 may be generated based on detected initial trigger 356 and detected subsequent trigger 358 in response to their detection by first device 102. Proceeding to block 510 "identify a second hash generated by the second device in response to detection of the initial and subsequent triggers with the second device, wherein the second hash is generated based on the initial trigger and the subsequent trigger" a second hash generated by the second device based on the initial and subsequent triggers may be identified by the first device in response to detection of the initial and subsequent triggers with the second device. For instance, authentication hash 466 generated by second device 104 based on detected initial trigger 462 and detected subsequent trigger 464 may be identified by the first device 102 in response to their detection by second device 104. In such instance, authentication hash 466 may be communicated from the second device 104 to the first device 102 via data channel 467 prior to identification by the first device 102.

Continuing to block 512 "determine the first hash and the second hash match based on a comparison" the first hash and the second hash may be determined to match based on a comparison. For example, comparator 474 may determine authentication hashes 466, 470 match based on a comparison. Continuing to block 514 "authenticate detection of the initial and subsequent triggers in response to determination the first hash and the second hash match based on the comparison" detection of the initial and subsequent triggers may be authenticated in response to determination the first and second hash match. For instance, trigger authenticator 232 may authenticate detected initial triggers 356, 462 and detected subsequent triggers 358, 464 in response to determination authentication hashes 470, 466 match. At block 516 "generate a prompt on the first device to initiate a transaction between the first and second entities in response to authenticated detection of the initial and subsequent triggers" a prompt may be generated on the first device to initiate a transaction between the first and second entities in response to authenticated detection of the initial and subsequent triggers. For example, initiation prompt 114 may be generated on the first device 102 to initiate a transaction between the first and second entities 220, 222 (e.g., as part of one of responses 354) in response to authentication of detected initial triggers 356, 462 and detected subsequent triggers 358, 464.

Figure 5B:
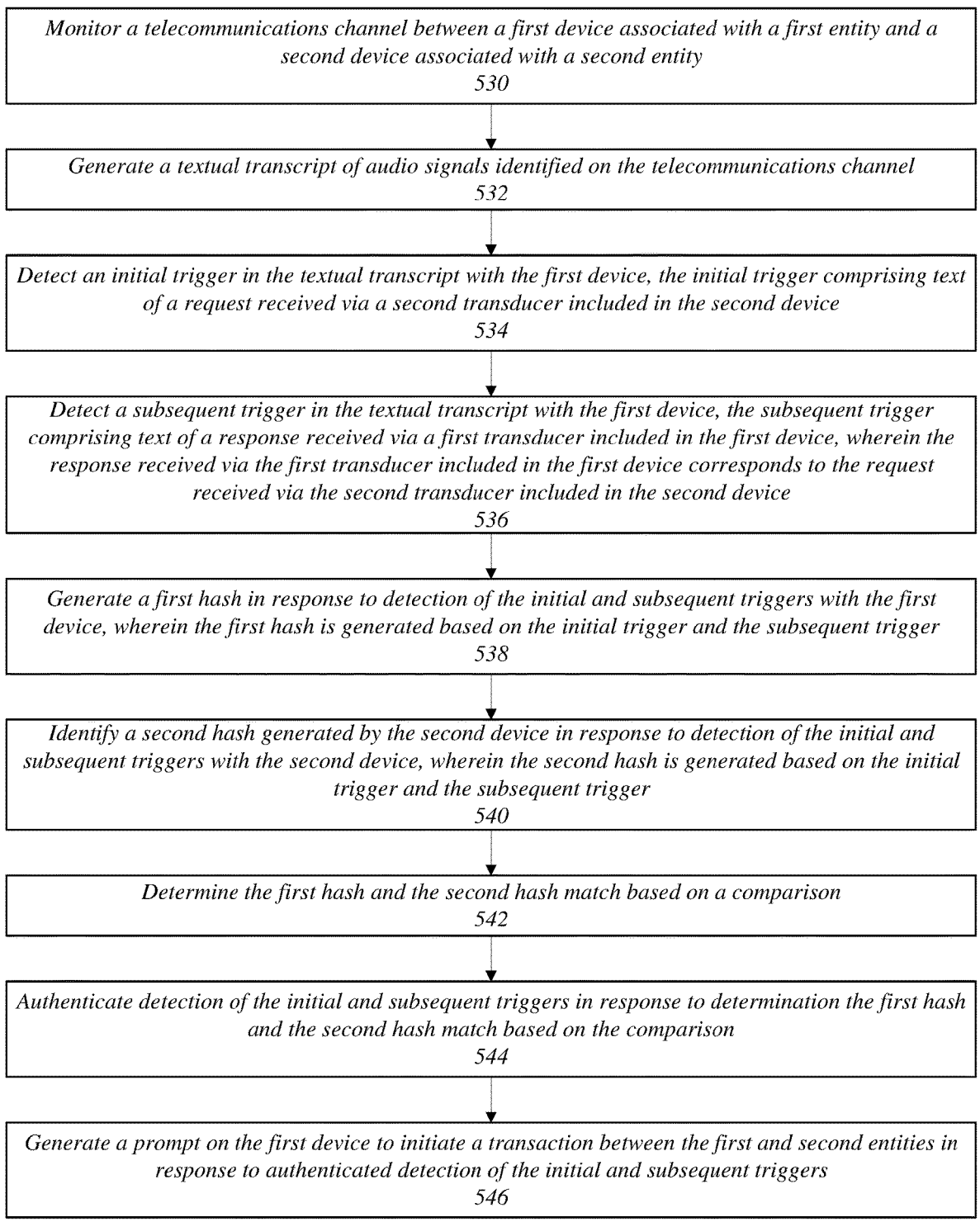
FIG. 5B illustrates a second exemplary logic flow according to one or more embodiments described herein.

FIG. 5B illustrates one embodiment of a logic flow 500B, which may be representative of operations that may be executed in various embodiments in conjunction with techniques for multi-voice speech recognition commands. The logic flow 500B may be representative of some or all of the operations that may be executed by one or more components/devices/environments described herein, such as first device 102 and/or second device 104. The embodiments are not limited in this context.

In the illustrated embodiments, logic flow 500B may begin at block 530. At block 530 "monitor a telecommunications channel between a first device associated with a first entity and a second device associated with a second entity" a telecommunications channel between a first device associated with a first entity and a second device associated with a second entity may be monitored. For example, telecommunications channel 106 between first device 102 associated with first entity 220 and second device 104 associated with second entity 222 may be monitored. Continuing to block 532 "generate a textual transcript of audio signals identified on the telecommunications channel" a textual transcript of audio signals identified on the telecommunications channel may be generated. For example, textual transcript 344 may be generated by channel monitor 340 based on audio signals 338 on telecommunications channel 106.

At block 534 "detect an initial trigger in the textual transcript with the first device, the initial trigger comprising text of a request received via a second transducer included in the second device" an initial trigger comprising text of a request received via a second transducer included in the second device may be detected in the textual transcript with the first device. For instance, initial trigger 108 comprising text of a request received via transducer 234 of second device 104 may be detected in textual transcript 344 with trigger detector 230 of first device 102.

Continuing to block 536 "detect a subsequent trigger in the textual transcript with the first device, the subsequent trigger comprising text of a response received via a first transducer included in the first device, wherein the response received via the first transducer included in the first device corresponds to the request received via the second transducer included in the second device" a subsequent trigger comprising text of a response received via a first transducer included in the first device and corresponding to the request may be detected in the textual transcript with the first device. For example, subsequent trigger 110 comprising text of a response received via transducer 228 of first device 102 may be detected in textual transcript 344 with trigger detector 230 of first device 102.

At block 538 "generate a first hash in response to detection of the initial and subsequent triggers with the first device, wherein the first hash is generated based on the initial trigger and the subsequent trigger" a first hash may be generated based on the initial and subsequent triggers by the first device in response to detection of the initial and subsequent triggers with the first device. For instance, authentication hash 470 may be generated based on detected initial trigger 356 and detected subsequent trigger 358 in response to their detection by first device 102. Proceeding to block 540 "identify a second hash generated by the second device in response to detection of the initial and subsequent triggers with the second device, wherein the second hash is generated based on the initial trigger and the subsequent trigger" a second hash generated by the second device based on the initial and subsequent triggers may be identified by the first device in response to detection of the initial and subsequent triggers with the second device. For instance, authentication hash 466 generated by second device 104 based on detected initial trigger 462 and detected subsequent trigger 464 may be identified by the first device 102 in response to their detection by second device 104. In such instance, authentication hash 466 may be communicated from the second device 104 to the first device 102 via data channel 467 prior to identification by the first device 102.

Continuing to block 542 "determine the first hash and the second hash match based on a comparison" the first hash and the second hash may be determined to match based on a comparison. For example, comparator 474 may determine authentication hashes 466, 470 match based on a comparison. Continuing to block 544 "authenticate detection of the initial and subsequent triggers in response to determination the first hash and the second hash match based on the comparison" detection of the initial and subsequent triggers may be authenticated in response to determination the first and second hash match. For instance, trigger authenticator 232 may authenticate detected initial triggers 356, 462 and detected subsequent triggers 358, 464 in response to determination authentication hashes 470, 466 match. At block 546 "generate a prompt on the first device to initiate a transaction between the first and second entities in response to authenticated detection of the initial and subsequent triggers" a prompt may be generated on the first device to initiate a transaction between the first and second entities in response to authenticated detection of the initial and subsequent triggers. For example, initiation prompt 114 may be generated on the first device 102 to initiate a transaction between the first and second entities 220, 222 (e.g., as part of one of responses 354) in response to authentication of detected initial triggers 356, 462 and detected subsequent triggers 358, 464.

FIG. 5C illustrates one embodiment of a logic flow 500C, which may be representative of operations that may be executed in various embodiments in conjunction with techniques for multi-voice speech recognition commands. The logic flow 500C may be representative of some or all of the operations that may be executed by one or more components/devices/environments described herein, such as first device 102 and/or second device 104. The embodiments are not limited in this context.

In the illustrated embodiments, logic flow 500C may begin at block 550. At block 550 "monitoring a telecommunications channel between a first device associated with a first entity and a second device associated with a second entity" a telecommunications channel between a first device associated with a first entity and a second device associated with a second entity may be monitored. For example, telecommunications channel 106 between first device 102 associated with first entity 220 and second device 104 associated with second entity 222 may be monitored. At block 552 "detecting an initial trigger on the telecommunications channel with the first device, the initial trigger comprising an audible request received via a second transducer included in the second device" an initial trigger comprising an audible request received via a second transducer included in the second device may be detected on the telecommunications channel with the first device. For instance, initial trigger 108 comprising audible request 226 received via transducer 234 of second device 104 may be detected on telecommunications channel 106 with trigger detector 230 of first device 102.

Continuing to block 554 "detecting a subsequent trigger on the telecommunications channel with the first device, the subsequent trigger comprising an audible response received via a first transducer included in the first device, wherein the audible response received via the first transducer included in the first device corresponds to the audible request received via the second transducer included in the second device" a subsequent trigger comprising an audible response received via a first transducer included in the first device and corresponding to the audible request may be detected on the telecommunications channel with the first device. For example, subsequent trigger 110 comprising audible response 224 received via transducer 228 of first device 102 may be detected on telecommunication channel 106 with trigger detector 230 of first device 102.

At block 556 "generating a first hash in response to detection of the initial and subsequent triggers with the first device, wherein the first hash is generated based on the initial trigger and the subsequent trigger" a first hash may be generated based on the initial and subsequent triggers by the first device in response to detection of the initial and subsequent triggers with the first device. For instance, authentication hash 470 may be generated based on detected initial trigger 356 and detected subsequent trigger 358 in response to their detection by first device 102. Proceeding to block 558 "identifying a second hash generated by the second device in response to detection of the initial and subsequent triggers with the second device, wherein the second hash is generated based on the initial trigger and the subsequent trigger" a second hash generated by the second device based on the initial and subsequent triggers may be identified by the first device in response to detection of the initial and subsequent triggers with the second device. For instance, authentication hash 466 generated by second device 104 based on detected initial trigger 462 and detected subsequent trigger 464 may be identified by the first device 102 in response to their detection by second device 104. In such instance, authentication hash 466 may be communicated from the second device 104 to the first device 102 via data channel 467 prior to identification by the first device 102.

Continuing to block 560 "authenticating detection of the initial and subsequent triggers in response to a determination the first hash and the second hash match" detection of the initial and subsequent triggers may be authenticated in response to determination the first and second hash match. For instance, trigger authenticator 232 may authenticate detected initial triggers 356, 462 and detected subsequent triggers 358, 464 in response to determination authentication hashes 470, 466 match. At block 562 "initiating a transaction between the first and second entities in response to authenticated detection of the initial and subsequent triggers" a transaction between the first and second entities may be initiated in response to authenticated detection of the initial and subsequent triggers. For example, a transaction between the first and second entities 220, 222 (e.g., as part of one of responses 354) in response to authentication of detected initial triggers 356, 462 and detected subsequent triggers 358, 464.

Figure 6:
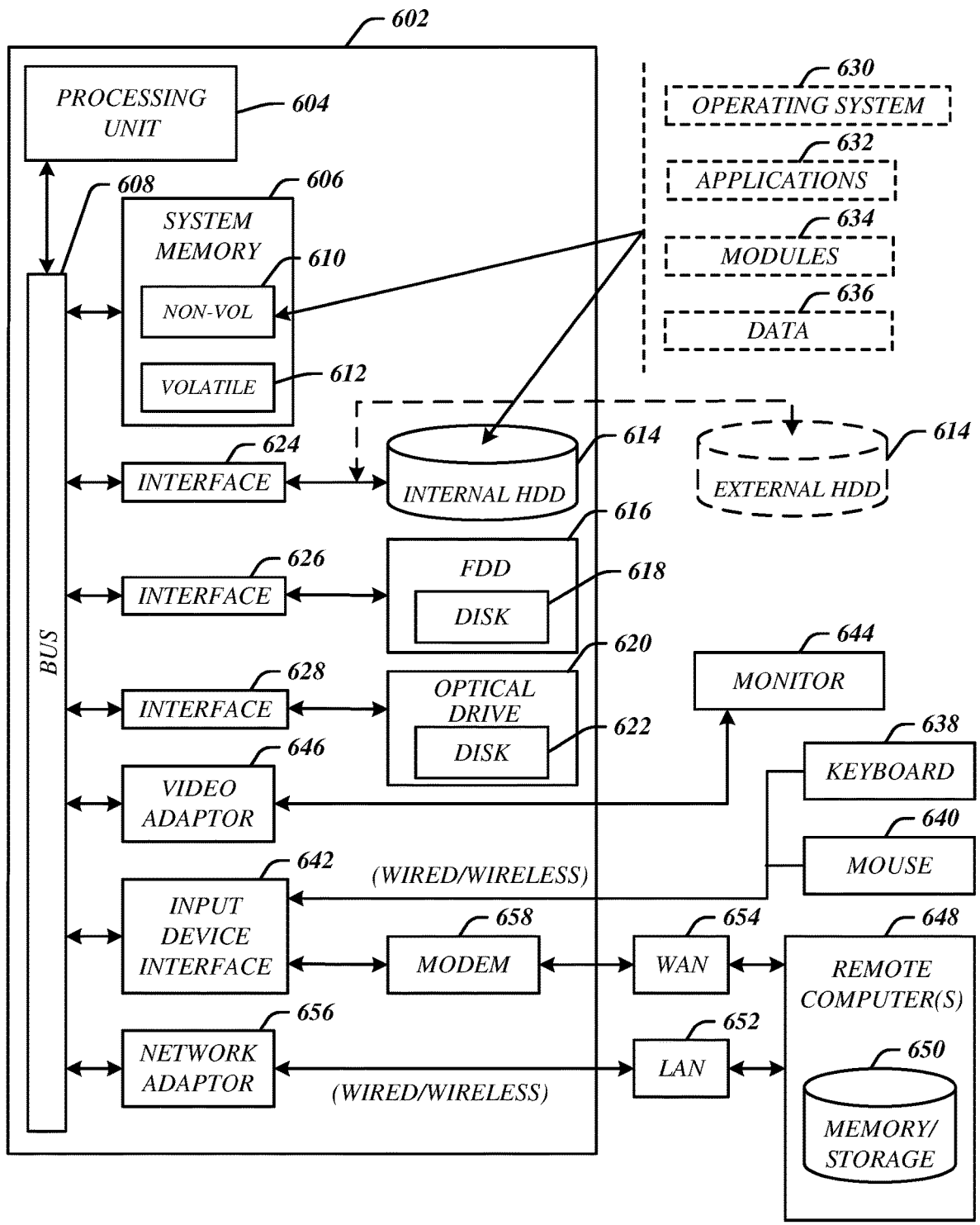
FIG. 6 illustrates exemplary aspects of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of one or more component described herein. In some embodiments, computing architecture 600 may be representative, for example, of a computing device that implements or utilizes one or more portions of components and/or techniques described herein, such as first device 102, second device 104, and/or controller 235. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. In some embodiments, system memory 606 may include main memory. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include or implement, for example, the various techniques, applications, and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608 but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more interactions described herein may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
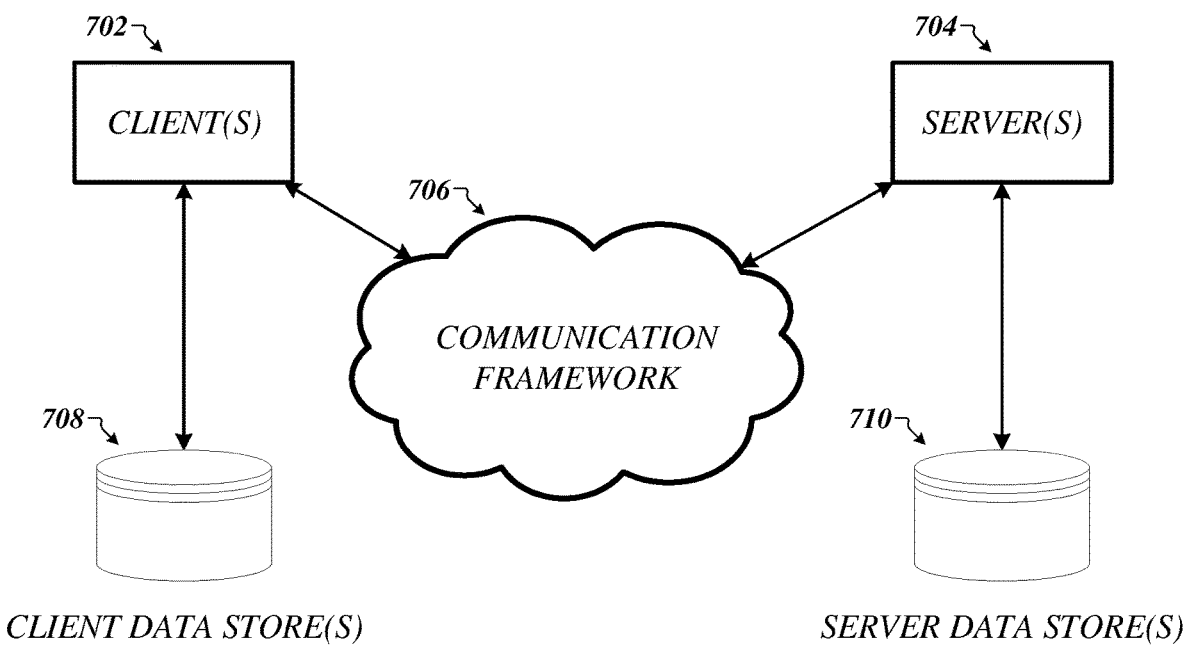
FIG. 7 illustrates exemplary aspects of a communications architecture according to one or more embodiments described herein.

FIG. 7 illustrates a block diagram of an exemplary communications architecture 700 suitable for implementing various embodiments, techniques, interactions, and/or components described herein, such as first device 102, second device 104, and/or controller 235. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described herein. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. An apparatus, comprising:
a processor; and
memory comprising instructions that when executed by the processor cause the processor to:
monitor a telecommunications channel between a first device associated with a first entity and a second device associated with a second entity;
detect an initial trigger on the telecommunications channel with the first device, the initial trigger comprising an audible request from the second entity received via a second transducer included in the second device;
detect a subsequent trigger on the telecommunications channel with the first device, the subsequent trigger comprising an audible response from the first entity received via a first transducer included in the first device, wherein the audible response from the first entity received via the first transducer included in the first device corresponds to the audible request from the second entity received via the second transducer included in the second device;
determine the initial trigger and the subsequent trigger are associated with a transaction between the first and second entities;
detect a detail of the transaction on the telecommunication channel with the first device;
generate, at the first device, a first hash in response to detection of the initial and subsequent triggers with the first device, wherein the first hash is generated based on the initial trigger and the subsequent trigger;
identify a second hash generated by the second device and communicated to the first device in response to detection of the initial and subsequent triggers with the second device, wherein the second hash is generated based on the initial trigger and the subsequent trigger;
determine the first hash and the second hash match based on a comparison;
authenticate detection of the initial and subsequent triggers in response to determination the first hash and the second hash match based on the comparison; and
generate a prompt with the detail of the transaction on the first device to initiate the transaction between the first and second entities in response to authenticated detection of the initial and subsequent triggers.

2. The apparatus of claim 1, the memory comprising instruction that when executed by the processor cause the processor to:
determine the first and second devices are within a proximity threshold; and
generate the prompt on the first device to initiate the transaction between the first and second entities in response to authenticated detection of the initial and subsequent triggers and determination the first and second devices are within the proximity threshold.

3. The apparatus of claim 1, the memory comprising instruction that when executed by the processor cause the processor to verify the second entity as source of the audible request based on a voice fingerprint of the second entity.

4. The apparatus of claim 1, the memory comprising instruction that when executed by the processor cause the processor to generate the first hash in response to detection of the initial and subsequent triggers by the first device within a predefined period of time.

5. The apparatus of claim 1, the memory comprising instruction that when executed by the processor cause the processor to receive the second hash from the second device in response to detection of the initial and subsequent triggers on the telecommunications channel by the second device.

6. The apparatus of claim 1, the memory comprising instruction that when executed by the processor cause the processor to receive the second hash from the second device in response to detection of the initial and subsequent triggers on the telecommunications channel by the second device and verification of the second entity as source of the audible request based on a voice fingerprint of the second entity.

7. The apparatus of claim 1, wherein comparison of the first hash and the second hash is comprised in a handshake procedure between the first and second devices.

8. The apparatus of claim 1, wherein the prompt generated on the first device to initiate the transaction between the first and second entities comprises a request for security credentials associated with the first entity.

9. The apparatus of claim 1, wherein the audible request comprises a request for money, the audible response comprises an agreement to the request for money, and the transaction between the first and second entities comprises a transfer of money from a first account associated with the first entity to a second account associated with the second entity.

10. At least one non-transitory computer-readable medium comprising a set of instructions that, in response to being executed by a processor circuit, cause the processor circuit to:
monitor a telecommunications channel between a first device associated with a first entity and a second device associated with a second entity;
generate a textual transcript of audio signals identified on the telecommunications channel;
detect an initial trigger in the textual transcript with the first device, the initial trigger comprising text of an audible request from the second entity received via a second transducer included in the second device;
detect a subsequent trigger in the textual transcript with the first device, the subsequent trigger comprising text of an audible response from the first entity received via a first transducer included in the first device, wherein the audible response from the first entity received via the first transducer included in the first device corresponds to the audible request from the second entity received via the second transducer included in the second device;
determine the initial trigger and the subsequent trigger are associated with a transaction between the first and second entities;
detect a detail of the transaction on the telecommunication channel with the first device;
generate, at the first device, a first hash in response to detection of the initial and subsequent triggers with the first device, wherein the first hash is generated based on the initial trigger and the subsequent trigger;
identify a second hash generated by the second device and communicated to the first device in response to detection of the initial and subsequent triggers with the second device, wherein the second hash is generated based on the initial trigger and the subsequent trigger;
determine the first hash and the second hash match based on a comparison;
authenticate detection of the initial and subsequent triggers in response to determination the first hash and the second hash match based on the comparison; and
generate a prompt with the detail of the transaction on the first device to initiate the transaction between the first and second entities in response to authenticated detection of the initial and subsequent triggers.

11. The at least one non-transitory computer-readable medium of claim 10, comprising instructions that, in response to being executed by the processor circuit, cause the processor circuit to:
determine the first and second devices are within a proximity threshold; and
generate the prompt on the first device to initiate the transaction between the first and second entities in response to authenticated detection of the initial and subsequent triggers and determination the first and second devices are within the proximity threshold.

12. The at least one non-transitory computer-readable medium of claim 10, comprising instructions that, in response to being executed by the processor circuit, cause the processor circuit to generate the first hash in response to detection of the initial and subsequent triggers by the first device within a predefined number of characters in the textual transcript.

13. The at least one non-transitory computer-readable medium of claim 10, comprising instructions that, in response to being executed by the processor circuit, cause the processor circuit to receive the second hash from the second device in response to detection of the initial and subsequent triggers by the second device.

14. The at least one non-transitory computer-readable medium of claim 10, the prompt generated on the first device to initiate the transaction between the first and second entities comprising a request for security credentials associated with the first entity.

15. The at least one non-transitory computer-readable medium of claim 10, the request comprising a request for money, the response comprising an agreement to the request for money, and the transaction between the first and second entities comprising a transfer of money from a first account associated with the first entity to a second account associated with the second entity.

16. A computer-implemented method, comprising:
monitoring a telecommunications channel between a first device associated with a first entity and a second device associated with a second entity;
detecting an initial trigger on the telecommunications channel with the first device, the initial trigger comprising an audible request from the second entity received via a second transducer included in the second device;
detecting a subsequent trigger on the telecommunications channel with the first device, the subsequent trigger comprising an audible response from the first entity received via a first transducer included in the first device, wherein the audible response from the first entity received via the first transducer included in the first device corresponds to the audible request from the second entity received via the second transducer included in the second device;
determining the initial trigger and the subsequent trigger are associated with a transaction between the first and second entities;
detecting a detail of the transaction on the telecommunication channel with the first device;
generating, at the first device, a first hash in response to detection of the initial and subsequent triggers with the first device, wherein the first hash is generated based on the initial trigger and the subsequent trigger;
identifying a second hash generated by the second device and communicated to the first device in response to detection of the initial and subsequent triggers with the second device, wherein the second hash is generated based on the initial trigger and the subsequent trigger;

authenticating detection of the initial and subsequent triggers in response to a determination the first hash and the second hash match; and initiating the transaction between the first and second entities in response to authenticated detection of the initial and subsequent triggers, wherein the transaction is based, at least in part, on the detail of the transaction.

17. The computer-implemented method of claim 16, comprising:

determining the first and second devices are within a proximity threshold; and initiating the transaction between the first and second entities in response to authenticated detection of the initial and subsequent triggers and determination the first and second devices are within the proximity threshold.

18. The computer-implemented method of claim 16, comprising verifying the first entity as source of the audible request based on a voice fingerprint of the first entity.

19. The computer-implemented method of claim 16, comprising generating the first hash in response to detection of the initial and subsequent triggers by the first device within a predefined period of time.

20. The computer-implemented method of claim 16, comprising receiving the second hash from the second device in response to detection of the initial and subsequent triggers on the telecommunications channel by the second device and verification of the second entity as source of the audible request based on a voice fingerprint of the second entity.

* * * * *